US009716541B2

(12) United States Patent
Sanderovich et al.

(10) Patent No.: US 9,716,541 B2
(45) Date of Patent: Jul. 25, 2017

(54) SYSTEMS AND METHODS FOR REDUCING INTERFERENCE USING POLARIZATION DIVERSITY

(71) Applicant: QUALCOMM Incorporated, San Diego, CA (US)

(72) Inventors: Amichai Sanderovich, Atlit (IL); Reuven Alpert, Caesarea (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/855,283

(22) Filed: Sep. 15, 2015

(65) Prior Publication Data

US 2017/0078013 A1    Mar. 16, 2017

(51) Int. Cl.
| | | |
|---|---|---|
| H04W 72/08 | (2009.01) | |
| H04B 7/10 | (2017.01) | |
| H04W 24/02 | (2009.01) | |
| H04B 7/04 | (2017.01) | |
| H04B 7/08 | (2006.01) | |

(52) U.S. Cl.
CPC ............ *H04B 7/10* (2013.01); *H04B 7/0469* (2013.01); *H04B 7/0857* (2013.01); *H04W 24/02* (2013.01)

(58) Field of Classification Search
CPC .. H04W 64/00; H04W 4/02; H04L 29/08657; G01S 5/02
USPC ........... 455/452.2, 63.1, 67.13, 114.2, 115.1, 455/115.3; 375/219, 225, 227; 370/328, 370/331–332, 333, 334
See application file for complete search history.

(56) References Cited

U.S. PATENT DOCUMENTS

| | | | | |
|---|---|---|---|---|
| 5,152,164 A | * | 10/1992 | Horiuchi | B21B 27/028 492/1 |
| 6,356,771 B1 | | 3/2002 | Dent | |
| 9,398,480 B2 | * | 7/2016 | Siomina | H04W 24/10 |
| 2010/0304680 A1 | * | 12/2010 | Kuffner | H04B 7/10 455/63.1 |
| 2011/0189960 A1 | * | 8/2011 | Bhattacharya | H04B 17/00 455/67.11 |
| 2012/0083215 A1 | | 4/2012 | Rofougaran et al. | |
| 2013/0072247 A1 | * | 3/2013 | Park | H04B 7/0408 455/513 |
| 2013/0343235 A1 | | 12/2013 | Khan | |
| 2014/0098695 A1 | * | 4/2014 | Jeong | H04B 7/0617 370/252 |
| 2015/0057007 A1 | | 2/2015 | Tarighat Mehrabani et al. | |

FOREIGN PATENT DOCUMENTS

EP        0847209 A2    6/1998

OTHER PUBLICATIONS

International Search Report and Written Opinion—PCT/US2016/049116—ISA/EPO—Oct. 27, 2016.

\* cited by examiner

*Primary Examiner* — Cong Tran
(74) *Attorney, Agent, or Firm* — Loza & Loza

(57) ABSTRACT

A method for wireless communications is described herein according to certain aspects. The method comprises receiving interference from at least one interference source at each one of two or more polarizations, measuring a strength of the received interference at each one of the two or more polarizations, selecting one of the two or more polarizations based on the measured interference strengths, and communicating with a remote device using the selected one of the two or more polarizations.

25 Claims, 9 Drawing Sheets

SYSTEMS AND METHODS FOR REDUCING INTERFERENCE USING POLARIZATION DIVERSITY

FIELD

This disclosure relates generally to wireless communications, and in particular, to systems and methods for reducing interference using polarization diversity.

BACKGROUND

In order to address the issue of increasing bandwidth requirements demanded for wireless communication systems, different schemes are being developed. In some schemes, data is wirelessly transmitted at high data rates (e.g., several Gigabits/s) over one or more channels in the 60 GHz frequency band.

SUMMARY

Certain aspects of the present disclosure provide a method for wireless communications. The method comprises receiving interference from at least one interference source at each one of two or more polarizations, measuring a strength of the received interference at each one of the two or more polarizations, selecting one of the two or more polarizations based on the measured interference strengths, and communicating with a remote device using the selected one of the two or more polarizations.

Certain aspects of the present disclosure provide an apparatus for wireless communications. The apparatus comprises an interface configured to receive interference from at least one interference source at each one of two or more polarizations. The apparatus also comprises a processing system configured to measure a strength of the received interference at each one of the two or more polarizations, to select one of the two or more polarizations based on the measured interference strengths, and to communicate with a remote device, via the interface, using the selected one of the two or more polarizations.

Certain aspects of the present disclosure provide an apparatus for wireless communications. The apparatus comprises means for receiving interference from at least one interference source at each one of two or more polarizations, means for measuring a strength of the received interference at each one of the two or more polarizations, means for selecting one of the two or more polarizations based on the measured interference strengths, and means for communicating with a remote device using the selected one of the two or more polarizations.

Certain aspects of the present disclosure provide a computer-readable medium. The computer-readable medium comprises instructions stored thereon for: receiving interference from at least one interference source at each one of two or more polarizations, measuring a strength of the received interference at each one of the two or more polarizations, selecting one of the two or more polarizations based on the measured interference strengths, and communicating with a remote device using the selected one of the two or more polarizations.

Certain aspects of the present disclosure provide a wireless node. The wireless node comprises at least one antenna, and a transceiver configured to receive, via the at least one antenna, interference from at least one interference source at each one of two or more polarizations. The wireless node also comprises a processing system configured to measure a strength of the received interference at each one of the two or more polarizations, to select one of the two or more polarizations based on the measured interference strengths, and to communicate with a remote device, via the transceiver and the at least one antenna, using the selected one of the two or more polarizations.

DETAILED DESCRIPTION

Figure 1:
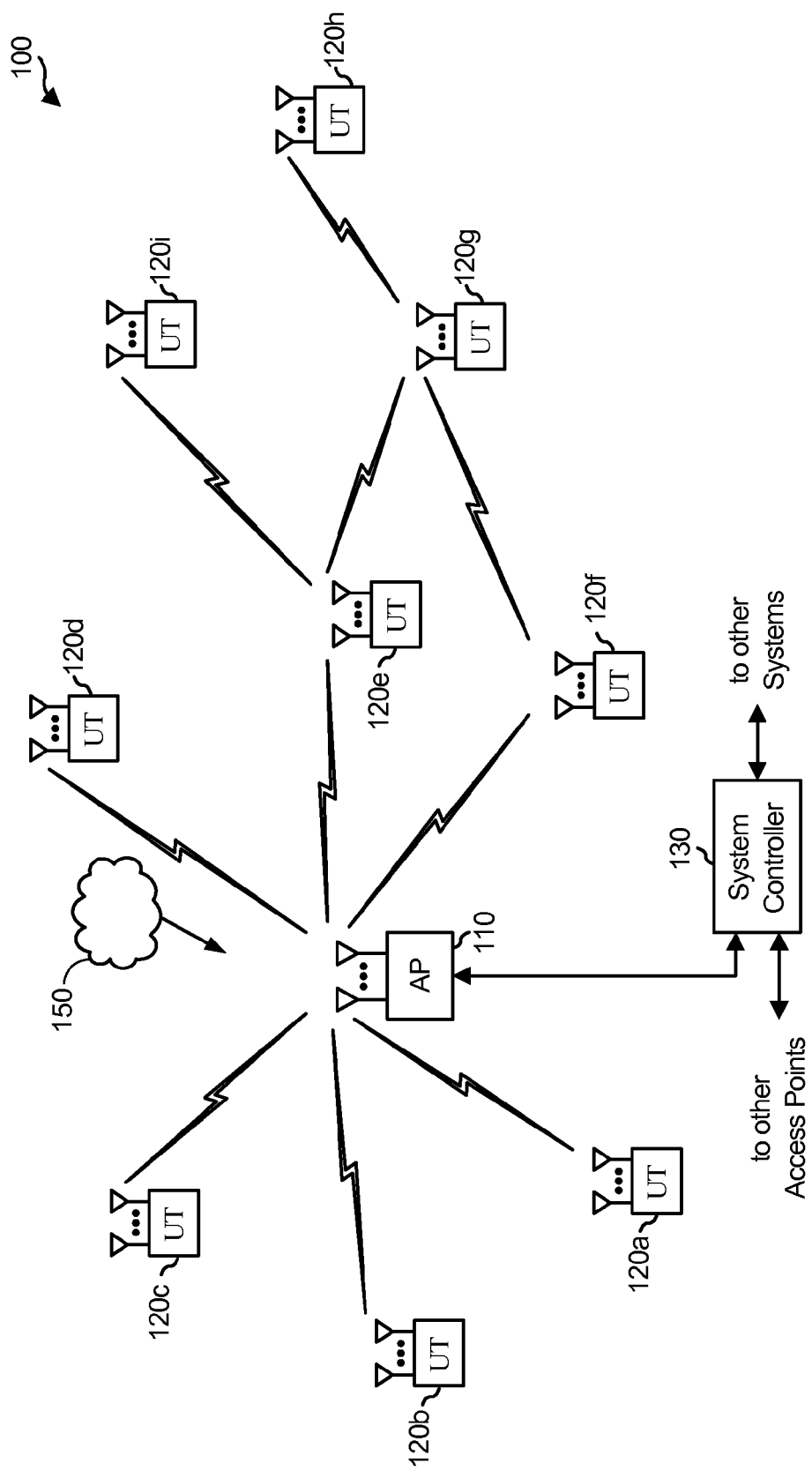
FIG. 1 illustrates a block diagram of an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a block diagram of an example of a wireless communication system 100 with a plurality of wireless nodes, such as access points and access terminals. For simplicity, only one access point 110 is shown. An access point is generally a fixed station that communicates with access terminals and may also be referred to as a base station or some other terminology. An access terminal may be fixed or mobile, and may be referred to as a mobile station, a wireless device or some other terminology. Access point 110 may communicate with one or more access terminals 120a to 120i at any given moment on the downlink and uplink. The downlink (i.e., forward link) is the communication link from the access point to the access terminals, and the uplink (i.e., reverse link) is the communication link from the access terminals to the access point. An access terminal may also communicate peer-to-peer with another access terminal. A system controller 130 couples to and provides coordination and control for the access points. The access point 110 may communicate with other devices coupled to a backbone network 150.

Figure 2:
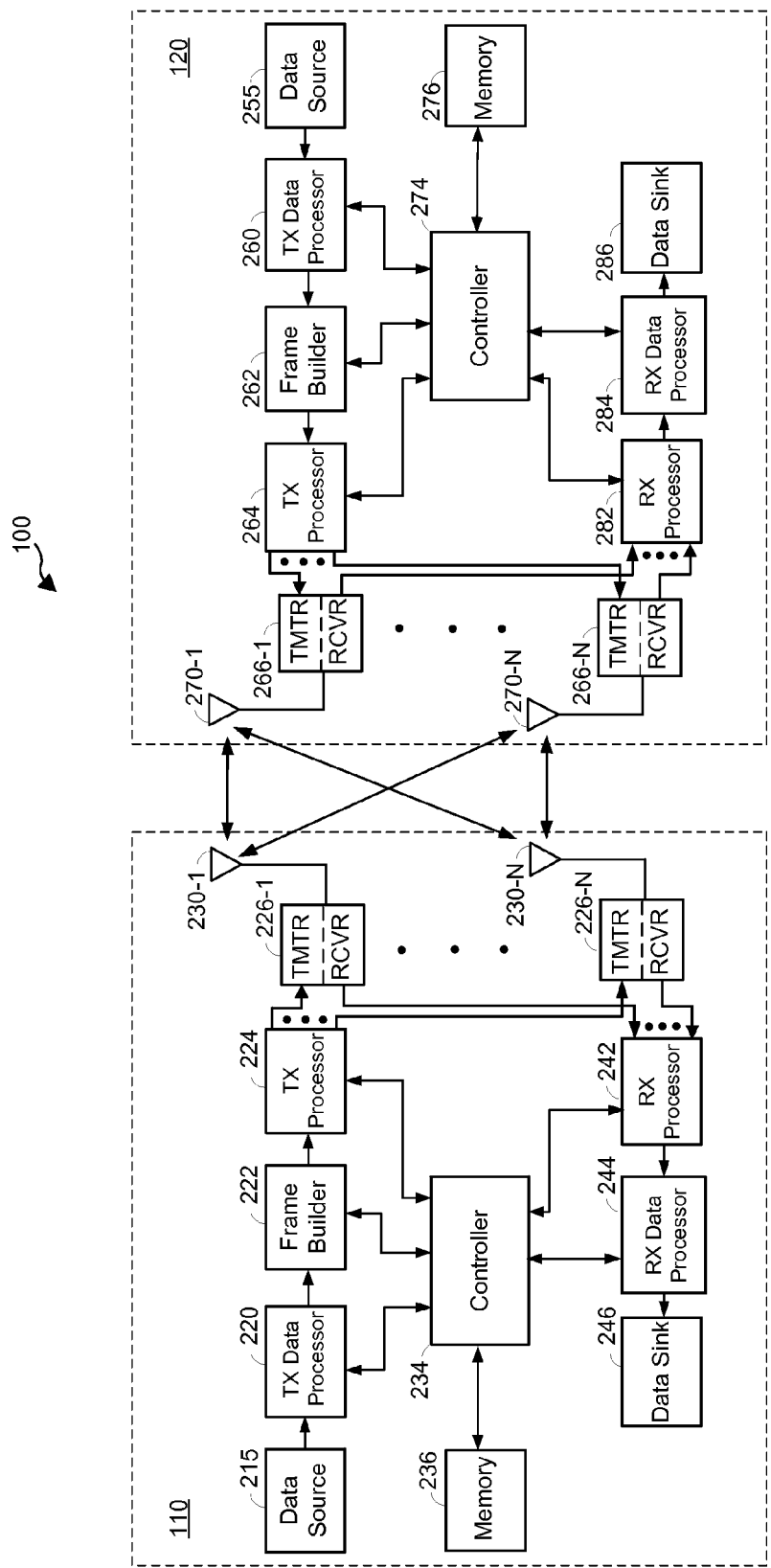
FIG. 2 is a block diagram of an exemplary access point and access terminal in accordance with certain aspects of the present disclosure.

FIG. 2 illustrates a block diagram of an access point 110 (generally, a first wireless node) and an access terminal 120 (generally, a second wireless node) in the wireless communication system 100. The access point 110 is a transmitting entity for the downlink and a receiving entity for the uplink. The access terminal 120 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel.

Although, in this example, wireless node 110 is an access point and wireless node 120 is an access terminal, it shall be understood that the wireless node 110 may alternatively be an access terminal, and wireless node 120 may alternatively be an access point.

For transmitting data, the access point 110 comprises a transmit data processor 220, a frame builder 222, a transmit processor 224, a plurality of transceivers 226-1 to 226-N, and a plurality of antennas 230-1 to 230-N. The access point 110 also comprises a controller 234 configured to control operations of the access point 110, as discussed further below.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

Figure 3:
FIG. 3 illustrates an exemplary frame structure in accordance with certain aspects of the present disclosure.

The frame builder 222 constructs a frame (also referred to as a packet), and inserts the data symbols into a data payload of the frame. An exemplary frame structure 310 is shown in FIG. 3. In this example, the frame structure 310 includes a preamble 315, a header 320, and the data payload 325. The preamble 315 may include a short training field (STF) sequence and a channel estimation (CE) sequence to assist the access terminal 120 in receiving the frame. The header 320 may include information related to the data in the payload. For example, the header 320 may include a duration field (also referred to as a length field) indicating the duration of the frame and/or payload and an MCS field indicating the MCS used to encode and modulate the data in the payload. This information allows the access terminal 120 to demodulate and decode the data. The header 320 may also include a destination address field identifying the destination (e.g., access terminal 120) of the data in the payload 325. The frame builder 222 outputs the frame to the transmit processor 224.

Returning to FIG. 2, the transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 110 includes multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 120 comprises a transmit data processor 260, a frame builder 262, a transmit processor 264, a plurality of transceivers 266-1 to 266-N, and a plurality of antennas 270-1 to 270-N. The access terminal 120 may transmit data to the access point 110 on the uplink, and/or transmit data to another access terminal (e.g., for peer-to-peer communication). The access terminal 120 also comprises a controller 274 configured to control operations of the access terminal 120, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame may have the exemplary frame structure 310 shown in FIG. 3. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 120 includes multiple antennas 270-1 to 270-N and multiple transceivers 266-1 to 266-N (e.g., one for each antenna). The transmit processor 264 may perform spatial processing on the incoming frame and provide a plurality of transmit frame streams for the plurality of antennas. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 110 comprises a receive processor 242, and a receive data processor 244. In operation, the transceivers 226-1 to 226-N receive signals (e.g., from the access terminal 120) via the antennas 230-1 to 230-N, and process (e.g., frequency downconvert, amplify, filter and convert to digital) the received signals.

The receive processor 242 receives the outputs of the transceivers 226-1 to 226-N, and processes the outputs to recover data symbols. For example, the access point 110 may receive data (e.g., from the access terminal 120) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CE sequence in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 120 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 110 includes multiple antennas 230-1 to 230-N and multiple transceivers 226-1 to 226-N (e.g., one for each antenna). Each transceiver receives and processes (e.g., frequency downconverts, amplifies, filters, frequency upconverts) the signal from the respective antenna. The receive processor 242 may perform spatial processing on the outputs of the transceivers 226-1 to 226-N to recover the data symbols.

For receiving data, the access terminal 120 comprises a receive processor 282, and a receive data processor 284. In operation, the transceivers 266-1 to 266-N receive signals (e.g., from the access point 110 or another access terminal) via the antennas 270-1 to 270-3, and process (e.g., frequency downconvert, amplify, filter and convert to digital) the received signals.

The receive processor 282 receives the output of the transceiver 266, and processes the output to recover data symbols. For example, the access terminal 120 may receive data (e.g., from the access point 110 or another access terminal) in a frame, as discussed above. In this example, the receive processor 282 may detect the start of the frame using the STF sequence in the preamble of the frame. The receive processor 282 may also perform channel estimation (e.g., using the CE sequence in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

As discussed above, the access point 110 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 120 includes multiple antennas 270-1 to 270-N and multiple transceivers 266-1 to 266-N (e.g., one for each antenna). Each transceiver receives and processes (e.g., frequency downconverts, amplifies, filters, frequency upconverts) the signal from the respective antenna. The receive processor 282 may perform spatial processing on the outputs of the transceivers to recover the data symbols.

As shown in FIG. 2, the access point 110 also comprises a memory 236 coupled to the controller 234. The memory 236 may store instructions that, when executed by the controller 234, cause the controller 234 to perform one or more of the operations described herein. Similarly, the access terminal 120 also comprises a memory 276 coupled to the controller 274. The memory 276 may store instructions that, when executed by the controller 274, cause the controller 274 to perform the one or more of the operations described herein.

In certain aspects, the communication system 100 may comprise a millimeter wave (mmWave) communication system. A benefit of a mmWave communication system is that it allows one wireless node (e.g., access point 110 or access terminal 120) in the system to transmit data at a very high rate (e.g., several Gigabits/s) to another wireless node (e.g., access terminal 120 or access point 110) in the system over one or more channels (e.g., in the 60 GHz frequency band). However, mmWave signals suffer from high signal path loss even at relatively short distances (e.g., due to strong absorption by Oxygen). To compensate for the high signal path loss, wireless nodes in the mmWave communication system may employ beamforming to direct transmission and reception towards one another. The strong directionality of the transmission and reception extends the range over which the wireless nodes can communication with one another and reduces interference to neighboring nodes.

Figure 4:
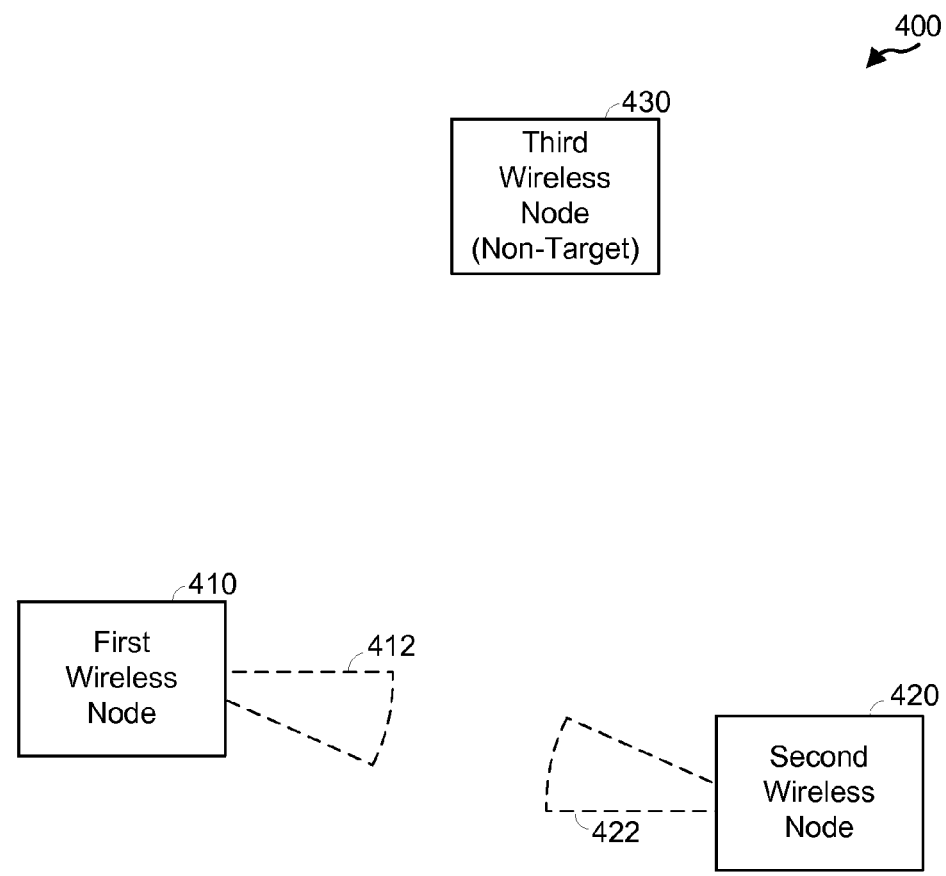
FIG. 4 shows an example of two wireless nodes communicating with each other using directional beams in accordance with certain aspects of the present disclosure.

In this regard, FIG. 4 shows an exemplary communication system 400 including a first wireless node 410, a second wireless node 420, and a third wireless node 430. For ease of illustration, the antennas of each wireless node are not shown in FIG. 4. In this example, the second wireless node 420 directs a transmit beam 422 towards the first wireless node 410 to direct transmission to the first wireless node 410 (i.e., target of the transmission). The transmit beam 422 concentrates transmission energy in the direction of the first wireless node 410, extending the range over which the second wireless node 420 can transmit data to the first wireless node 410. Further, the transmit beam 422 reduces interference from the transmission at the third wireless node 430, which is not the target of the transmission (i.e., not the intended recipient of the transmission). Also, in this example, the first wireless node 410 directs a receive beam 412 towards the second wireless node 420. This increases the receive sensitivity of the first wireless node 410 in the direction of the second wireless node 420, thereby improving reception of the transmission at the first wireless node 410. The directions of the transmit beam 422 and receive beam 412 can be determining during a beam training procedure, as discussed further below.

Figure 5A:
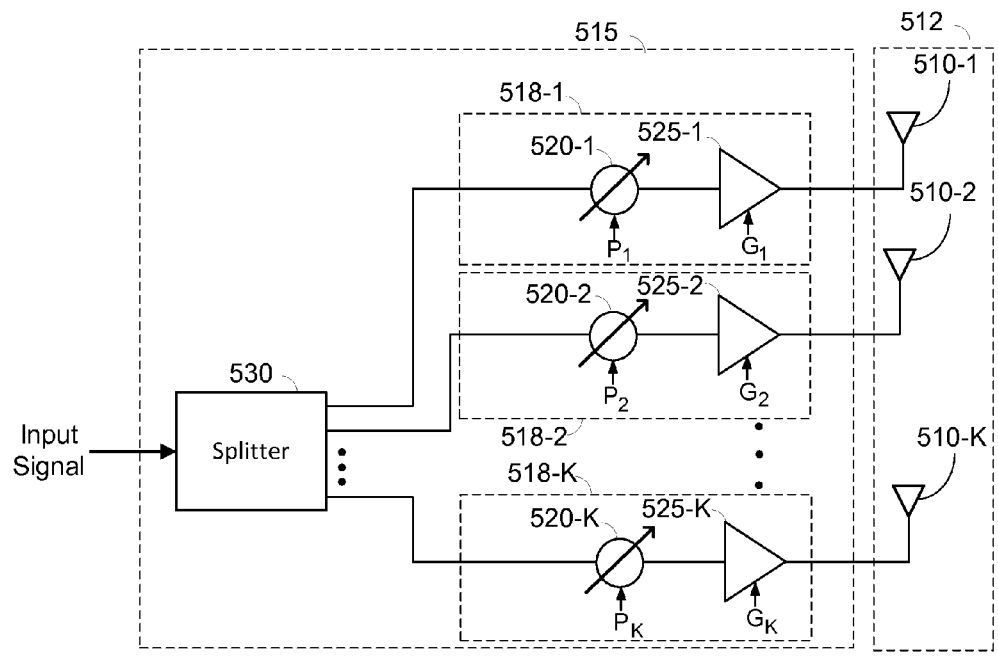
FIG. 5A shows an example of a beamformer for transmitting a signal using a directional transmit beam in accordance with certain aspects of the present disclosure.

In certain aspects, a wireless node may generate a directional beam using a beamformer and an antenna array. In this regard, FIG. 5A shows an example of a transmit beamformer 515 and an antenna array 512 configured to generate a directional transmit beam for directional transmission. The antenna array 512 comprises a plurality of antennas 510-1 to 510-K. The beamformer 515 comprises a signal splitter 530, and a plurality of branches 518-1 to 518-K, where each branch 518-1 to 518-K is coupled to a respective one of the antennas 510-1 to 510-K. Each branch 518-1 to 518-N may further comprise a respective tunable phase shifter 520-1 to 520-K and respective tunable amplifier 525-1 to 525-K. The phase shift of each phase shifter 520-1 to 520-K is controlled by a respective phase-shift control signal $P_1$ to $P_K$, and the gain of each amplifier 525-1 to 525-K is controlled by a respective gain control signal $G_1$ to $G_K$.

In operation, the splitter 530 receives an input signal for transmission, and splits the signal among the branches 518-1 to 518-K. Each phase shifter 520-1 to 520-K shifts the phase of the signal in the respective branch according to the respective phase-shift control signal $P_1$ to $P_K$, and each amplifier 525-1 to 525-K amplifies the signal in the respective branch according to the respective gain control signal $G_1$ to $G_K$. The output signal of each branch 518-1 to 518-K is fed to the respective antenna 510-1 to 510-K of the antenna array 512 for transmission. The transmitted output signals form a directional transmit beam, in which the direction of the transmit beam is a function of the relative phases and amplitudes of the transmitted output signals. Thus, the signal input to the beamformer 515 is transmitted in the directional transmit beam, in which the direction of the transmit beam is controlled by the phase-shift control signals $P_1$ to $P_K$, and the gain control signals $G_1$ to $G_K$ input to the beamformer 515.

In one example, the beamformer 515 and the antenna array 512 may be implemented in the access point 110 in FIG. 2 for directional transmission. In this example, the antennas 510-1 to 510-K may correspond to the antennas 230-1 to 230-N or subset of the antennas 230-1 to 230-N in FIG. 2, and the beamformer 515 may be implemented in the transmit processor 224 and/or the transceivers 226-1 and 226-N or subset of the transceivers 226-1 to 226-N in FIG. 2. The controller 234 may control the direction of the transmit beam by controlling the values of the phase-shift control signals $P_1$ to $P_K$, and the gain control signals $G_1$ to $G_K$, accordingly. In this regard, the controller 234 may store a set of phase-shift values and gain values (e.g., weight vector) for each one of a plurality of different beam directions in the memory 236. In this example, the controller 234 may orientate the transmit beam in a particular direction by retrieving the corresponding set of phase-shift values and gain values from the memory 236, and setting the phase shifts and gains of the beamformer 515 accordingly. The beamformer 515 and the antenna array 512 may also be implemented in the access terminal 120 in a similar manner for directional transmission.

It is to be appreciated that embodiments of the present disclosure are not limited to the exemplary beamformer 515 and antenna array 512 in FIG. 5A. For example, directional beams may also be formed using a plurality of directional antennas, in which each directional antenna is configured to transmit a signal in a different direction. In this example, a signal may be transmitted in a particular direction by feeding the signal to the corresponding one of the directional antennas. Directional transmit beams may also be generated using a combination of a phased antenna array and directional antennas.

Figure 5B:
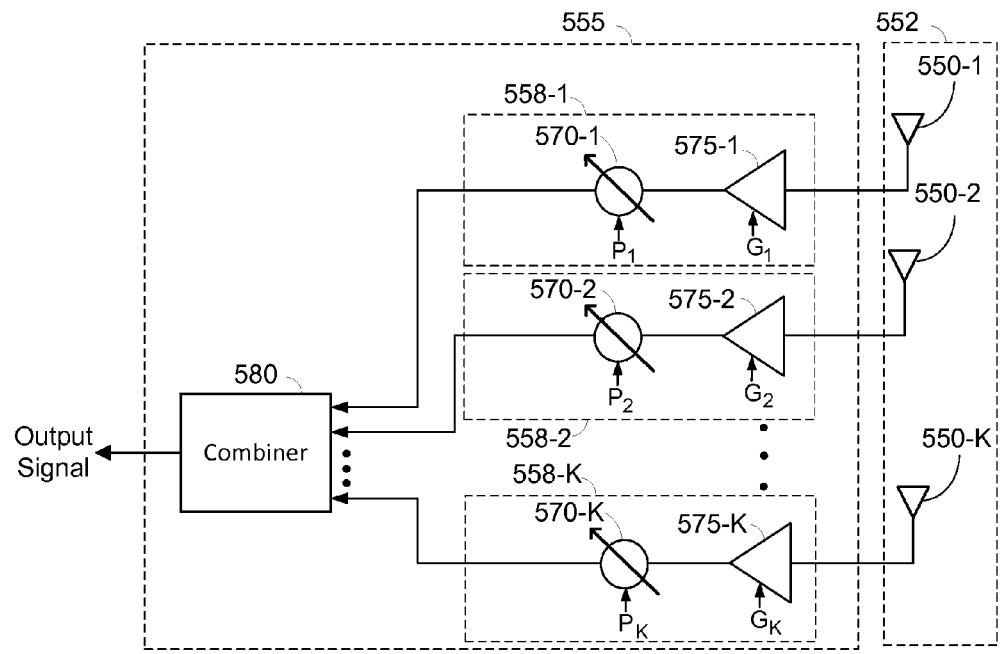
FIG. 5B shows an example of a beamformer for receiving a signal using a directional receive beam in accordance with certain aspects of the present disclosure.

FIG. 5B shows an example of a receive beamformer 555 and an antenna array 552 configured to receive a signal using a directional receive beam for directional reception. The antenna array 552 comprises a plurality of antennas 550-1 to 550-K. The beamformer 555 comprises a signal combiner 580, and a plurality of branches 558-1 to 558-K, where each branch 558-1 to 558-K is coupled to a respective one of the antennas 550-1 to 550-K. Each branch 558-1 to 558-N may further comprise a respective tunable phase shifter 570-1 to 570-K and respective tunable amplifier 575-1 to 575-K. The phase shift of each phase shifter 570-1 to 570-K is controlled by a respective phase-shift control signal $P_1$ to $P_K$, and the gain of each amplifier 575-1 to 575-K is controlled by a respective gain control signal $G_1$ to $G_K$.

In operation, each of the branches 558-1 to 558-K receives a signal from the respective antenna 550-1 to 550-K. Each phase shifter 570-1 to 570-K shifts the phase of the signal in the respective branch according to the respective phase-shift control signal $P_1$ to $P_K$, and each amplifier 575-1 to 575-K amplifies the signal in the respective branch according to the respective gain control signal $G_1$ to $G_K$. The output signal of each branch 518-1 to 518-K is fed to the signal combiner 580, which combines the signals into an output signal. The relative phases and amplitudes of the branches increase receive sensitivity within a directional receive beam, in which the direction of the receive beam is a function of the phase-shift control signals $P_1$ to $P_K$, and the gain control signals $G_1$ to $G_K$ input to the beamformer 555.

In one example, the beamformer 555 and the antenna array 552 may be implemented in the access point 110 in FIG. 2 for directional reception. In this example, the antennas 550-1 to 550-K may correspond to the antennas 230-1 to 230-N or subset of the antennas 230-1 to 230-N in FIG. 2, and the beamformer 555 may be implemented in the receive processor 242 and/or the transceivers 226-1 and 226-N or subset of the transceivers 226-1 to 226-N in FIG. 2. The controller 234 may control the direction of the receive beam by controlling the values of the phase-shift control signals $P_1$ to $P_K$, and the gain control signals $G_1$ to $G_K$, accordingly. In this regard, the controller 234 may store a set of phase-shift values and gain values (e.g., weight vector) for each one of a plurality of beam directions in the memory 236. In this example, the controller 234 may orientate the receive beam in a particular direction by retrieving the correspond set of phase-shift values and gain values from the memory 236, and setting the phase shifts and gains of the beamformer 555 accordingly. The beamformer 555 and the antenna array 552 may also be implemented in the access terminal 120 in a similar manner for directional reception.

It is to be appreciated embodiments of the present disclosure are not limited to the exemplary beamformer 555 and antenna array 552 in FIG. 5B. For example, signals may be received in different directions using a plurality of directional antennas, in which each antenna direction is configured to receive a signal in a different direction. Directional receive beams may also be implemented using a combination of a phased antenna array and directional antennas.

It is also to be appreciated that a wireless node (e.g., access point 110 or access terminal 120) may also receive and transmit signals in an omni-directional mode as well as the directional mode discussed above. For example, a wireless node may transmit a signal in the omni-directional mode when the signal is intended to be received by more than one wireless node or when the wireless node does not know the direction of the intended receiving wireless node. In another example, a wireless node may receive a signal in the omni-directional mode when the wireless node does not know the direction of the transmitting wireless node. The wireless node may operate in the omni-directional mode using an omni-directional antenna and/or operating a plurality of antennas to transmit and receive in an omni-directional beam.

In certain aspects, the communication system 100 uses polarization diversity to increase capacity and/or reduce interference. For example, polarization diversity may allow wireless nodes in close proximity to reuse the same frequency to increase capacity by having the wireless nodes transmit signals using different polarizations. In one example, a wireless node may support transmission and reception using different linear polarizations. The linear polarizations may include a horizontal polarization and a vertical polarization that are orthogonal to one another. In another example, a wireless node may support transmission and reception using different circular polarizations. The circular polarizations may include a right-handed circular polarization and a left-handed circular polarization, in which a signal transmitted using the right-handed circular polarization rotates in an opposite direction from a signal transmitted using the left-handed circular polarization. In yet another example, a wireless node may support transmission and reception using different circular and linear polarizations for greater polarization diversity.

Figure 6:
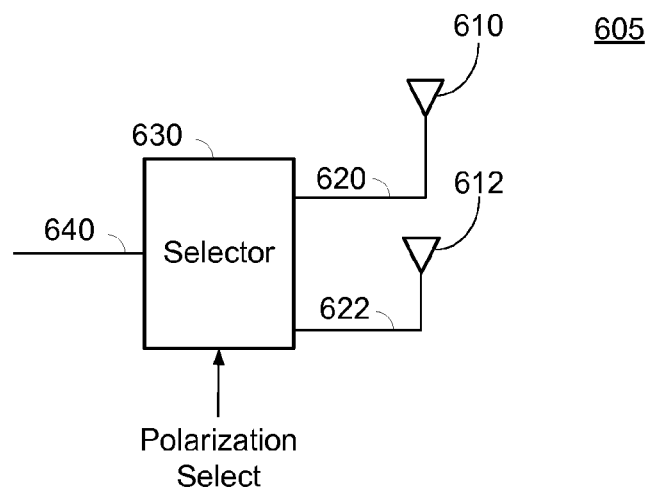
FIG. 6 shows an example of an antenna device configured to transmit and/or receive signals using different polarizations in accordance with certain aspects of the present disclosure.

FIG. 6 shows an example of an antenna device 605 configured to transmit and/or receive signals using different polarizations in accordance with certain aspects of the present disclosure. The antenna device 605 may be used to implement each of the antennas 230-1 to 230-N and 270-1 to 270-N in FIG. 2 or each of a subset of the antennas in FIG. 2. The antenna device 605 may comprise a first antenna element 610, a second antenna element 612, and a polarization selector 630. The selector 630 may be coupled to the first antenna element 610 via a first feed line 620, coupled to the second antenna element 612 via a second feed line 622, and coupled to a transceiver (e.g., transceiver 226 or 266) via a main feed line 640. Each of the first and second antenna elements 610 and 612 may be configured to transmit and/or receive signals using a different polarization. For example, for linear polarization, the first antenna element 610 may be configured transmit and/or receive signals using a horizontal polarization and the second antenna element 612 may be configured to transmit and/or receive signals using a vertical polarization orthogonal to the horizontal polarization. In another example, for circular polarization, the first antenna element 610 may be configured transmit and/or receive signals using a right-handed circular polarization and the second antenna element 612 may be configured to transmit and/or receive signals using a left-handed circular polarization.

In operation, the selector 630 receives a polarization select signal indicating a selected one of the two polarizations supported by the first and second antenna elements 610 and 612. The selector 630 then couples the main feed line 640 to the first antenna element 610 or the second antenna element 612 based on the selected polarization. Thus, the selector 630 allows the antenna device 605 to switch between the two polarizations based on the select signal. In certain aspects, the controller 234 or 274 may generate the select signal to allow the controller 234 or 247 to select the polarization, as discussed further below. As discussed above, each of the antennas 230-1 to 230-N or 270-1 to 270-N may be implemented using the antenna device 605. In this aspect, the controller 234 or 274 may control the polarization of each antenna by outputting a polarization select signal to each antenna.

It is to be appreciated that the antenna device 605 in FIG. 6 is not limited to two different polarizations. For example, the antenna device 605 may comprise additional antenna elements having polarizations that are different from the polarizations of the first and second antenna elements. In this example, the selector 630 may select any one of the antenna elements (i.e., the first and second antenna elements and the additional antenna elements) according to the polarization select signal to select any one of the polarizations supported by the antenna elements.

The first and second antenna elements 610 and 612 may be implemented using any one of a variety of different antenna structures for achieving different polarizations. For example, for linear polarization, the first and second antenna elements 610 and 612 may be implemented using two dipole antenna elements that are orientated orthogonal to one another. In another example, for circular polarization, the first and second antenna elements 610 and 612 may be implemented using two spiral antenna elements that spiral in opposite directions. In yet another example, each of the first and second antenna elements 610 and 612 may be implemented using a patch antenna comprising a metal layer over a ground plane. In this example, the metal layer of an antenna element may have one or more U-shaped slots, one or more L-shaped slots, one or more T-shaped slots, and/or one or more slots of other shapes to achieve a desired polarization for the antenna element. It is to be appreciated that the first and second antenna elements 610 and 612 are not limited to the examples given above, and may be implemented using other antenna structures.

Figure 7A:
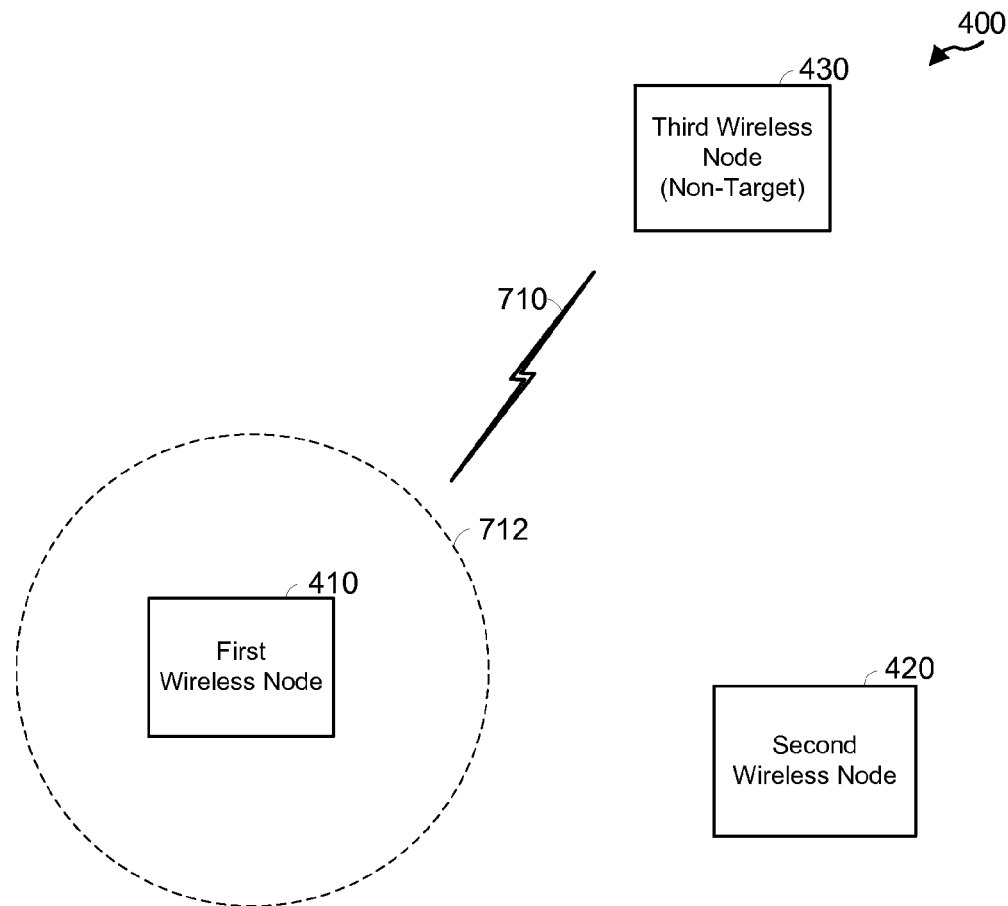
FIG. 7A shows an example of a wireless node measuring interference for different polarizations in an omni-directional mode in accordance with certain aspects of the present disclosure.

In certain aspects, polarization diversity is exploited to reduce interference at a wireless node. In this regard, FIG. 7A shows an example in which the first wireless node 410 in FIG. 4 experiences interference 710 from the third wireless node 430. The interference 710 may comprise a signal that is intended for (addressed to) a fourth wireless node (not shown), and is therefore an interfering signal with respect to the first wireless node 410. In this example, the first wireless node 410 may detect the interference 710 by detecting and decoding a destination address in a frame (also referred to as a packet) of the interference 710, and determining that the destination address corresponds to a wireless node other than the first wireless node 410 (i.e., the destination address does not match the address of the first wireless node 410). The destination address may be found in an address field of the frame. In another example, the first wireless node 410 may detect interference by measuring receive power during a time that the first wireless node 410 is not receiving a transmission from the second wireless node 420. In this example, the first wireless node 410 detect interference when the receive power is above a certain threshold.

Although FIG. 7A shows one interference source (i.e., third wireless node 430) for simplicity, it is to be appreciated that the first wireless node 410 may receive interference from additional interference sources (e.g., other wireless nodes in the communication system). The first wireless node 410 may detect the interference from each interference source using any of the techniques discussed above.

After detecting the interference 710, the first wireless node 410 may determine which one of a plurality of polarizations supported by the first wireless node 410 minimizes the interference 710 at the first wireless node 410. For example, the first wireless node 410 may measure the strength of the interference 710 for each of the polarizations in an omni-directional mode using an omni-directional beam 712. In this example, the controller 234 or 274 switches the first wireless node 410 to each of the polarizations. For each of the polarizations, the receive processor 242 or 282 may measure the strength of the interference 710 at the first wireless node 410. The measured strength of the interference 710 may be any measurement indicative of the amplitude, energy and/or power of the interference 710. In certain aspects, the receive processor 242 or 282 may also measure the strength of a signal from the second wireless node 420 or other target node for each of the polarizations, and determine the strength of the signal relative to the strength of the interference 710 (e.g., a signal to interference plus noise ratio (SINR)).

After measuring the strength of the interference 710 for each of the polarizations, the controller 234 or 247 may select the polarization for which the measured strength of the interference 710 is the lowest or the SINR is the highest. The controller 234 or 247 may then store the selected polarization in the memory 236 or 276 for later use, as discussed further below.

Figure 7B:
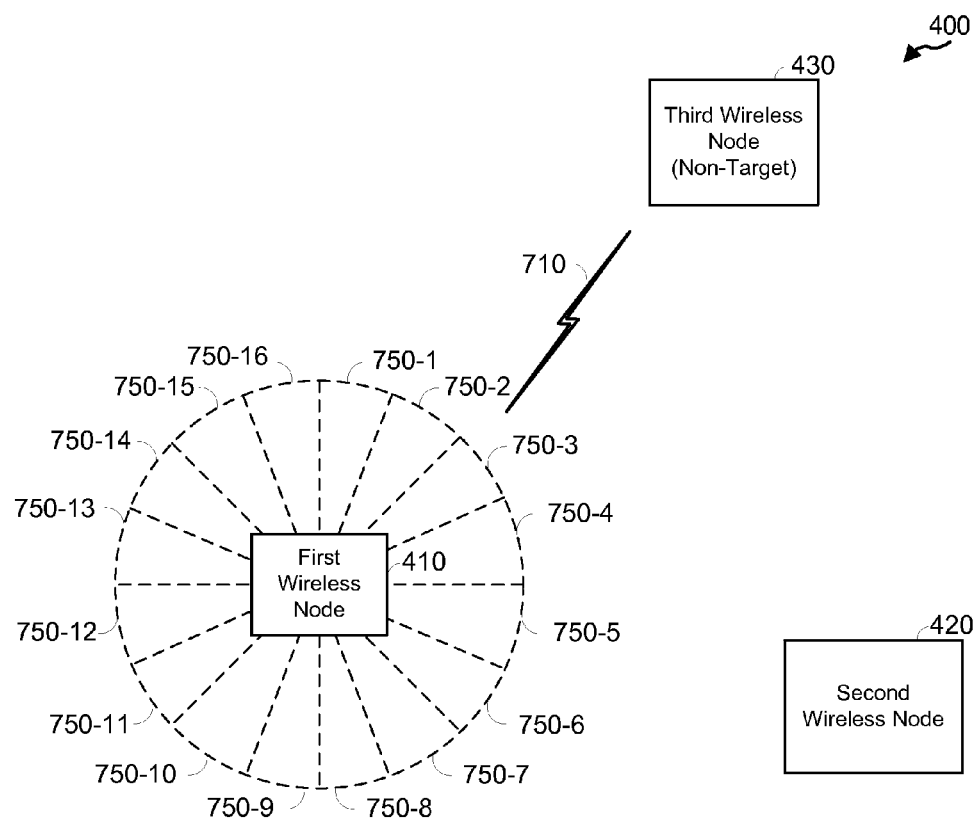
FIG. 7B shows an example of a wireless node measuring interference for different polarizations in a directional mode in accordance with certain aspects of the present disclosure.

FIG. 7B shows another example in which the first wireless node 410 measures the strength of the interference 710 for each of the polarizations in a directional mode. In this example, the controller 234 or 274 may switch the first wireless node 410 to each one of a plurality of different directional receive beams 750-1 to 750-16. For each of the receive beams 750-1 to 750-16, the controller 234 or 274 may switch the first wireless node 410 to each of the polarizations, and measure the strength of the interference 710 and/or the SINR for each of the polarizations.

For each of the receive beams 750-1 to 750-16, the controller 234 or 274 may select the polarization for which the strength of the interference 710 is the lowest for the receive beam or the SINR is the highest for the receive beam. The controller 234 or 247 may then store the selected polarization for each of the receive beams 750-1 to 750-16 in memory 236 or 276 for later use, as discussed further below. For each of the selected polarizations, the controller 234 or 247 may also store an indicator indicating the corresponding receive beam.

It is to be appreciated that aspects of the present disclosure are not limited to the exemplary receive beams 750-1 to 750-16 shown in FIG. 7B. For example, the first wireless node 410 may have any number of receive beams, and may have receive beams of various widths and shapes. It is also to be appreciated that the first wireless node 410 may also have overlapping receive beams.

Thus, for each of the receive beams 715-1 to 750-16, the first wireless node 410 may select the polarization resulting in the lowest interference strength or highest SINR for the receive beam, and store the select polarization for each beam in memory. It is to be appreciated that the second wireless node 420 may also perform the above steps to select polarizations for different beams that result in the lowest interference strength or highest SINR.

As discussed above, the interference 710 may comprise a frame (also referred to as a packet) addressed to a wireless node (not shown) other than the first wireless node 410. In this example, the first wireless node 410 may detect the interference 710 by receiving and decoding an address in the frame, and detecting the inference if the address does not match the address of the first wireless node 410. If the interference is detected, then the first wireless node 410 may receive and decode a duration field in the frame to determine the time duration of the frame. The first wireless node 410 may then receive and measure the interference at the different beams and polarizations, as discussed above, within the determined time duration.

Figure 8:
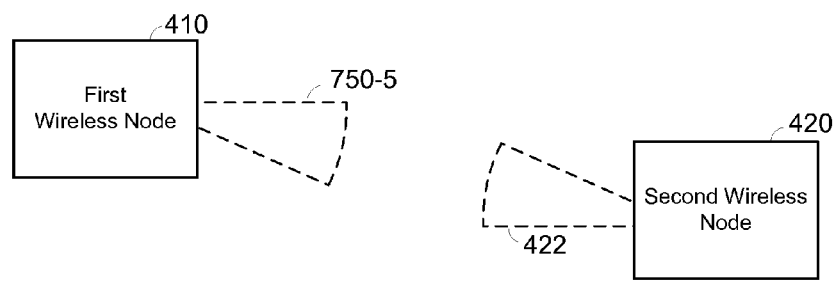
FIG. 8 shows another example of two wireless nodes communicating with each other using directional beams in accordance with certain aspects of the present disclosure.

After selecting the polarizations for the different beams, the first wireless node 410 may use this information in selecting a polarization for communication with the second wireless node 420. For instance, the first wireless node 410 may select one of the receive beams 750-1 to 750-16 for receiving transmissions from the second wireless node 420 (e.g., during a beam training procedure). An example of this is illustrated in FIG. 8, in which the first wireless node 410 selects receive beam 750-5, which is directed towards the second wireless node 420 in this example. After selecting receive beam 750-5, the first wireless node 410 uses the selected polarization for receive beam 750-5 to receive communications from the second wireless node 420. The first wireless node 410 may do this, for example, by retrieving the polarization selected for receive beam 750-5 from memory.

In another example, the first wireless node 410 may receive signals in the omni-directional mode (e.g., when the first wireless node 410 does not know the direction of a transmitting wireless node). In this example, the first wireless node 410 uses the selected polarization for the omni-directional mode to receive transmissions in the omni-directional mode. The first wireless node 410 may do this, for example, by retrieving the polarization for the omni-directional mode from memory.

In yet another example, the first wireless node 410 may transmit signals to the second wireless node 420 using a transmit beam directed towards the second wireless node 420. The transmit beam may have a similar shape as receive beam 750-5 in FIG. 8 and/or may point in the approximately the same direction (i.e., towards the second wireless node 420). In this example, the first wireless node 410 may use the selected polarization for receive beam 750-5 for the transmit beam. This may be based on receive-transmit reciprocity, in which the selected polarization for a receive beam is assumed to also provide reduced interference for a corresponding transmit beam (e.g., a transmit beam having a similar shape and/or pointing in approximately the same direction). This assumption may be valid, for example, when the receive beam and transmit beam are formed using use the same antenna array (e.g., antennas 230-1 to 230-N or antennas 270-1 to 270-N).

Figure 9:
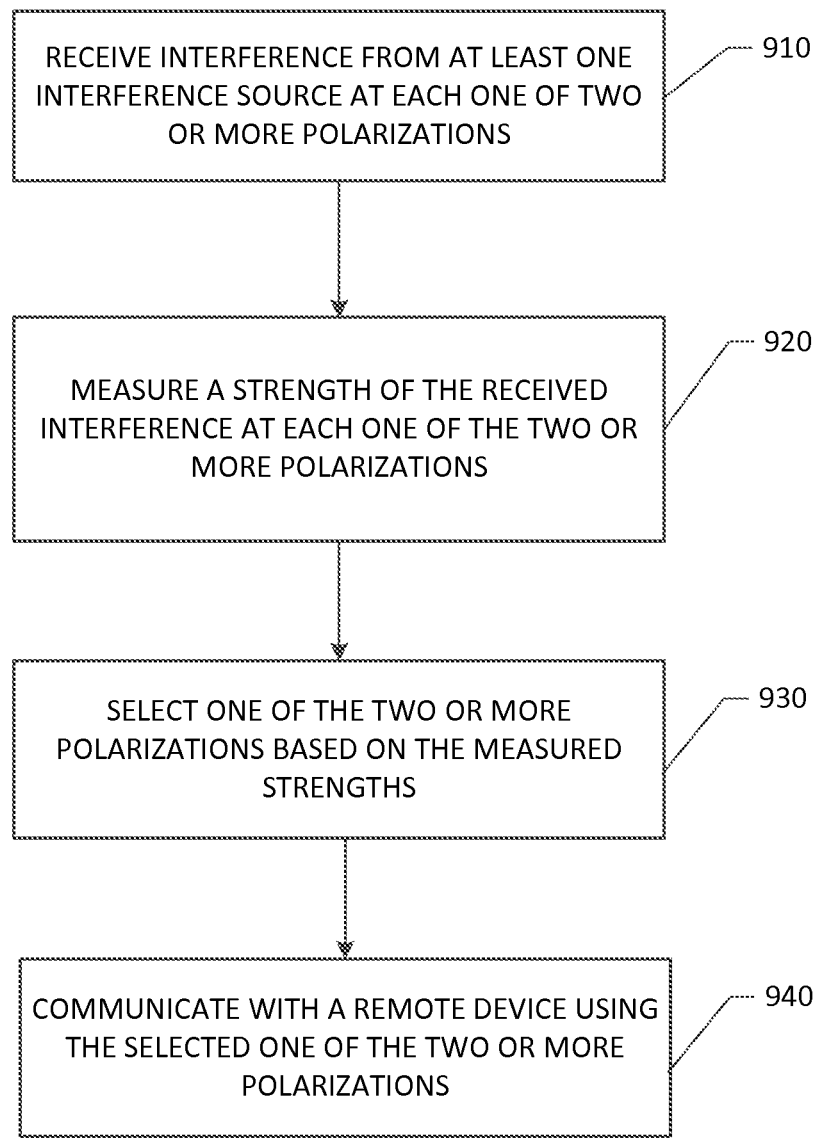

FIG. 9 is a flowchart illustrating a method 900 for selecting a polarization according to certain aspects of the present disclosure. The method 900 may be performed by a wireless node (e.g., the first wireless node 410).

At step 910, interference from at least one interference source is received at each one of two or more polarizations. For example, the interference may comprise a signal addressed to another wireless node. The two or more polarizations may comprise two or more of the following: a horizontal polarization, a vertical polarization, a right-handed circular polarization, and a left-handed circular polarization. In one example, the interference may be received using an omni-directional beam. In another example, the interference may be received using a directional receive beam. In this example, the directional receive beam may be selected based on a known direction of a remote device, in which the direction may be known from prior beam training with the remote device, a signal from the remote device indicating its location, etc.

At step 920, the strength of the received interference is measured at each one of the two or more polarizations. For example, the strength of the received interference may be measured for each polarization by measuring the amplitude, power and/or energy of the interference. In another example, the strength of the interference at each polarization may be measured relative to a signal in the form of a SINR.

At step 930, one of the two or more polarizations is selected based on the measured strengths. For example, the polarization corresponding to the lowest measured interference strength or highest SINR may be selected.

At step 940, the selected one of the two or more polarizations is used to communicate with a remote device. For example, the communication may include receiving a signal from the remote device (e.g., second wireless node 420) using the selected polarization. If the interference is received using a directional receive beam in step 910, then the signal may be received from the remote station using the directional receive beam. In another example, the communication may include transmitting a signal to the remote device using the selected polarization, assuming receive-transmit reciprocity. If the interference is received using a directional receive beam in step 910, then the signal may be transmitted to the remote device using a directional transmit beam having a similar shape as the receive beam and/or pointing in approximately the same direction as the receive beam.

In certain aspects, steps 910 through 930 may be performed for each one of a plurality of receive beams (e.g., receive beams 750-1 to 750-16 or subset of receive beams 750-1 to 750-16) to select a polarization for each of the receive beams. In these aspects, one of the receive beams may be selected for communication with the remote device (e.g., the second wireless node 420) using beam training or other method. Once the receive beam is selected, the selected receive beam and the corresponding selected polarization may be used to receive a signal from the remote device.

As discussed above, the receive beam 750-5 and transmit beam 422 in FIG. 8 may be selected using a beam training procedure. In this regard, an exemplary beam training procedure according to certain aspects will now be discussed with reference to FIGS. 10A and 10B. In this example, the bream training procedure may comprise two stages, in which the transmit beam is determined in the first stage, and the receive beam is determined in the second stage, as discussed further below.

Figure 10A:
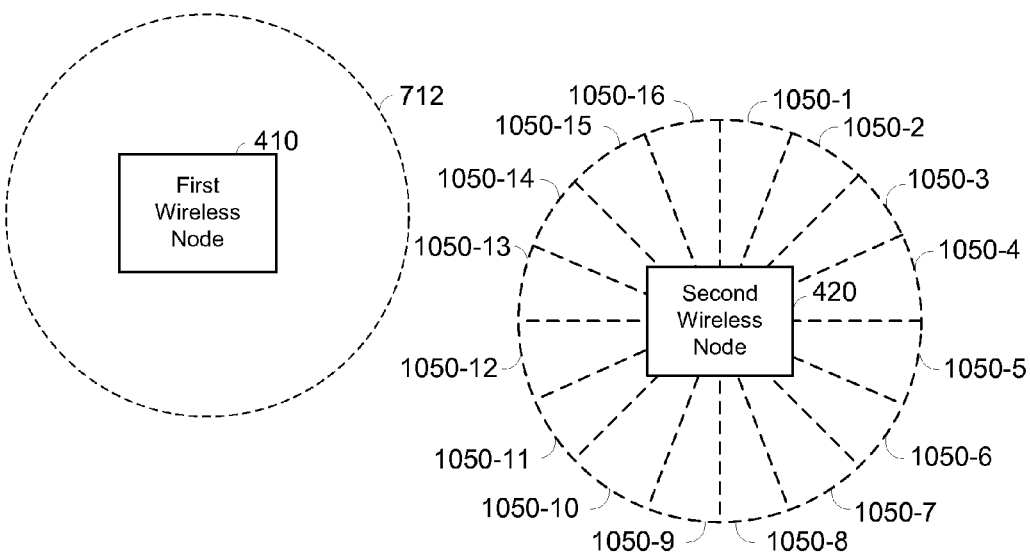
FIG. 10A shows an example of transmit beam training in accordance with certain aspects of the present disclosure.

With reference to FIG. 10A, during the first stage of the beam training procedure, the second wireless node 420 transmits beam-training signals using a plurality of directional transmit beams 1050-1 to 1050-16. For each of the transmit beams 1050-1 to 1050-16, the second wireless node 420 may transmit a beam-training signal for each one of a plurality of polarizations. Each beam-training signal may comprise a training sequence (e.g., code sequence), training packet, etc. Thus, the second wireless node 420 may sweep through the transmit beams 1050-1 to 1050-16, in which second wireless node 420 may transmit beam-training signals using different polarizations for each transmit beam.

The first wireless node 410 may receive one or more of the beam-training signals in the omni-directional mode using the selected polarization for the omni-directional mode discussed above. By using the selected polarization for receiving the beam-training signals, the first wireless node 410 incorporates the selected polarization into the beam training procedure. For each of the received beam-training signals, the first wireless node 410 may measure the strength of the beam-training signal (e.g., signal-to-noise ratio (SNR), received signal strength indicator (RSSI), etc. of the signal).

The first wireless node 410 may then determine the received beam-training signal having the highest strength, and transmit a feedback message to the second wireless node 420 identifying the determined beam-training signal. The first wireless node 410 may identify the determined beam-training signal using any one of a variety of techniques. For example, each bream-training signal may include a unique identifier that can be detected and decoded by the first wireless node 410. In this example, the first wireless node 410 may include the identifier of the determined beam-training signal in the message. In another example, the first wireless node 410 may identify the determined beam-training signal based on the time that the beam-training signal was received and/or the order in which the determined beam-training signal was received. Thus, the first wireless node 410 may provide the second wireless node 420 with feedback on the beam-training signal resulting in the highest received signal strength at the first wireless node 410.

Upon receiving the feedback message, the second wireless node 420 determines the transmit beam and polarization corresponding to the bream-training signal indicated in the message. In other words, the second wireless node 420 determines the transmit beam and polarization that were used to transmit the beam-training signal indicated in the message. The second wireless node 420 uses the determined transmit beam and polarization for subsequent transmissions to the first wireless node 410. Thus, the transmit beam is selected during the first stage of the beam-training procedure. In the example shown in FIG. 10A, transmit beam 1050-13 is selected.

Figure 10B:
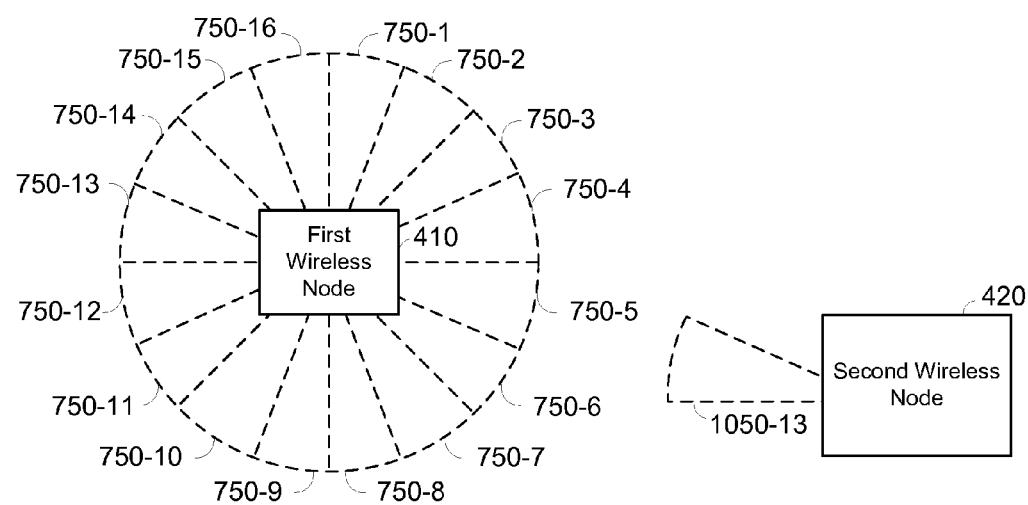
FIG. 10B shows an example of receive beam training in accordance with certain aspects of the present disclosure.

With reference to FIG. 10B, during the second stage of the beam training procedure, the second wireless node 420 transmits a plurality of beam-training signals using the transmit beam and polarization determined in the first stage. The first wireless node 410 may receive each beam-training signal using a different one of the receive beams (e.g., receive beams 750-1 to 750-16 or subset of receive beams 750-1 to 750-16). For each receive beam, the first wireless node 410 may use the selected polarization for the receive beam to receive the respective beam-training signal.

For each beam-training signal, the first wireless node 410 may measure the strength (e.g., SNR, RSSI, etc.) of the beam-training signal. After measuring the strengths of the beam-training signals, the first wireless node 410 may determine the beam-training signal with the highest strength, and select the receive beam corresponding to the beam-training signal with the highest signal strength. In the example in FIG. 10B, receive beam 750-5 is selected. The first wireless node 410 may use the selected receive beam and corresponding polarization for receiving transmissions from the second wireless node 420.

Thus, the beam-training procedure in the above example selects the transmit beam and receive beam for transmissions from the second wireless node 420 to the first wireless node 410, in which the transmit beam is trained in the first stage, and the receive beam is trained in the second stage. The same beam-training procedure may also be used to select a transmit beam and receive beam for transmissions from the first wireless node 410 to the second wireless node 420, in which the roles of the first and second wireless nodes are reversed.

It is to be appreciated that the second wireless node 420 may sweep through a subset of the transmit beams supported by the second wireless node 420 during the beam-training procedure to reduce the training time. For example, the second wireless node 420 may know the general direction of the first wireless node 410 (e.g., from prior beam training, location information for the first wireless node 410, etc.). In this example, the second wireless node 420 may narrow the sweep to a subset of the transmit beams pointing in directions close to the known general direction.

It is also to be appreciated that the first wireless node 410 may sweep through a subset of the receive beams supported by the first wireless node 410 during the beam-training procedure to reduce the training time. For example, the first wireless node 410 may know the general direction of the second wireless node 420 (e.g., from prior beam training, location information for the second wireless node 420, etc.). In this example, the first wireless node 410 may narrow the sweep to a subset of the receive beams pointing in directions close to the known general direction.

It is to be appreciated that embodiments of the present disclosure are not limited to the exemplary beam-training procedure discussed above, and may be used in other beam-training procedures.

Figure 11:
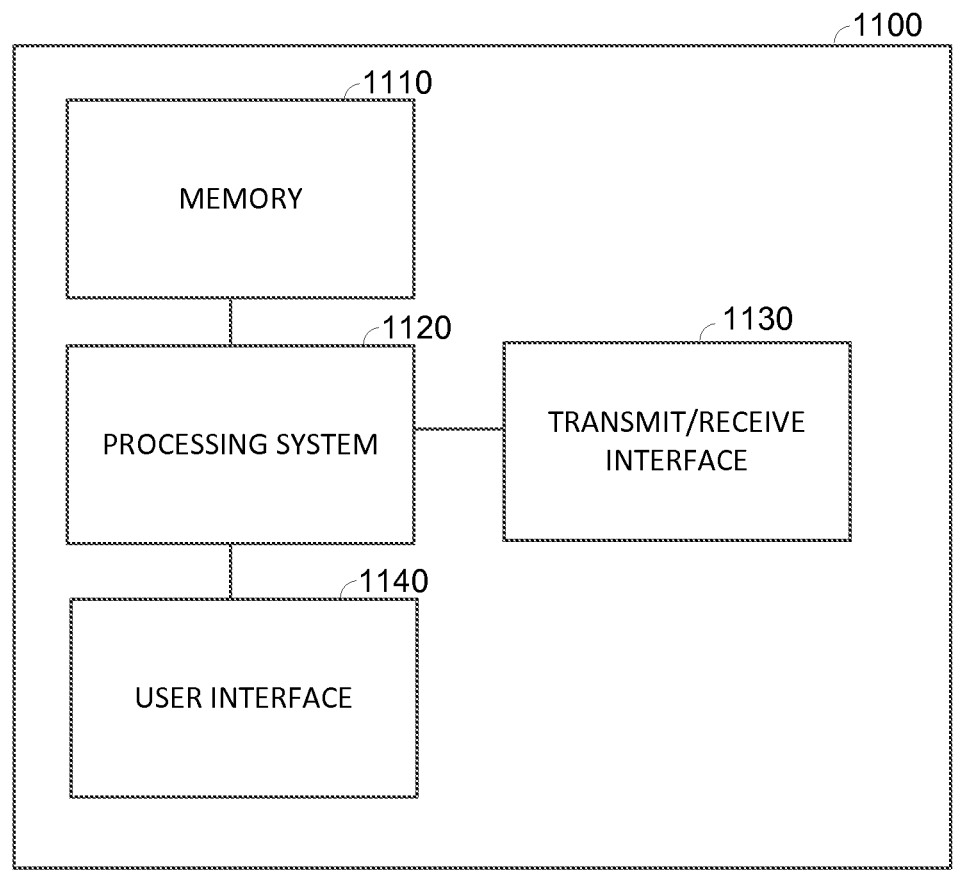
FIG. 11 illustrates a block diagram of an exemplary device in accordance with certain aspects of the present disclosure.

FIG. 11 illustrates an example device 1100 according to certain aspects of the present disclosure. The device 1100 may be configured to operate in a wireless node (e.g., access point 110 or access terminal 120) and to perform one or more of the operations described herein. The device 1100 includes a processing system 1120, and a memory 1110 coupled to the processor system 1120. The memory 1110 may store instructions that, when executed by the processing system 1120, cause the processing system 1120 to perform one or more of the operations described herein. Exemplary implementations of the processing system 1120 are provided below. The device 1100 also comprises a transmit/receiver interface 1130 coupled to the processing system 1120. The interface 1130 (e.g., interface bus) may be configured to interface the processing system 1120 to a radio frequency (RF) front end (e.g., transceivers 226-1 to 226-N or 226-1 to 266-N).

In certain aspects, the processing system 1120 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein.

In the case of an access terminal 120, the device 1100 may include a user interface 1140 coupled to the processing system 1120. The user interface 1140 may be configured to receive data from a user (e.g., via keypad, mouse, joystick, etc.) and provide the data to the processing system 1120. The user interface 1140 may also be configured to output data from the processing system 1120 to the user (e.g., via a display, speaker, etc.). In this case, the data may undergo additional processing before being output to the user. In the case of an access point 110, the user interface 1140 may be omitted.

As used herein, "interference" at an apparatus may include one or more signals intended for one or more other apparatuses. For example, the one or more signals may include one or more frames (packets) addressed to the one or more other apparatuses. In this example, the one or more signals may constitute interference with respect to the apparatus because the one or more signals may interfere with a signal intended for the apparatus. Interference may comprise unwanted signals at the apparatus transmitted by one or more other apparatuses (e.g., wireless nodes) in the same communication system (e.g., network) as the apparatus. Interference may also comprise unwanted signals at the apparatus transmitted by one or more other apparatuses in another communication system, in which the other communication system may use frequency bands overlapping frequency bands used by the communication system of the apparatus. Interference may also comprise RF emissions from one or more other apparatuses and/or a component in the apparatus.

The antennas 230-1 to 230-N and 270-1 to 270-N, the antenna device 605, the transmit/receive interface 1130, the transceivers 226-1 to 266-N and 266-1 to 266-N, and beamformers 515 and 555 are examples of means for receiving interference at each of one of two or more polarizations. The receive processors 242 and 282, controllers 234 and 274 and processing system 1120 are examples of means for measuring a strength of the received interference at each one of the two or more polarization, and means for selecting one of the two or more polarizations based on the measured inference strengths. The antennas 230-1 to 230-N and 270-1 to 270-N, the antenna device 605, the transmit/receive interface 1130, the transceivers 226-1 to 266-N and 266-1 to 266-N and beamformers 515 and 555 are examples of means for communicating with a remote device using the selected one of the two or more polarizations. The receive processors 242 and 282, controllers 234 and 274 and processing system 1120 are examples of means for selecting one of the two or more polarizations corresponding to a lowest one of the measured interference strengths. The receive processors 242 and 282, controllers 234 and 274 and processing system 1120 are examples of means for determining a signal to interference plus noise ratio (SINR) based on the respective measured interference strength, and means for selecting one of the two or more polarizations corresponding to the highest one of the SINRs. The antennas 230-1 to 230-N and 270-1 to 270-N, the antenna device 605, the transmit/receive interface 1130, the transceivers 226-1 to 266-N and 266-1 to 266-N and beamformers 515 and 555 are examples of means for receiving at least one destination address field in the at least one frame. The receive processors 242 and 282, controllers 234 and 274 and processing system 1120 are examples of means for decoding the at least one destination address field to determine at least one destination address of the frame, means for determining whether the address of the apparatus matches the at least one destination address, and means for detecting the interference if the address of the apparatus does not match the at least one destination address. The antennas 230-1 to 230-N and 270-1 to 270-N, the antenna device 605, the transmit/receive interface 1130, the transceivers 226-1 to 266-N and 266-1 to 266-N, and beamformers 515 and 555 are examples of means for receiving at least one duration field in the at least one frame. The receive processors 242 and 282, controllers 234 and 274 and processing system 1120 are examples of means for decoding the at least one duration field to determine the duration of the interference. The antennas 230-1 to 230-N and 270-1 to 270-N, the antenna device 605, the transmit/receive interface 1130, the transceivers 226-1 to 266-N and 266-1 to 266-N, and beamformers 515 and 555 are examples of means for receiving a plurality of signals from the remote device at the selected one of the two or more polarizations. The receive processors 242 and 282, controllers 234 and 274 and processing system 1120 are examples of means for measuring a strength of each of the one of the plurality of signals, and means for selecting one of the plurality of signals. The antennas 230-1 to 230-N and 270-1 to 270-N, the antenna device 605, the transmit/receive interface 1130, the transceivers 226-1 to 266-N and 266-1 to 266-N and beamformers 515 and 555 are examples of means for transmitting a message to the remote device indicating the selected one of the plurality of signals.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    an interface configured to receive interference at each one of two or more polarizations; and
    a processing system configured to:
        measure a strength of the received interference at each one of the two or more polarizations;
        determine, for each one of the two or more polarizations, a signal to interference plus noise ratio (SINR) based on the respective measured interference strength;
        select one of the two or more polarizations corresponding to a highest one of the SINRs; and
        communicate with a remote device, via the interface, using the selected one of the two or more polarizations.

2. The apparatus of claim 1, wherein the processing system is configured to communicate with the remote device by receiving a signal from the remote device, via the interface, at the selected one of the two or more polarizations.

3. The apparatus of claim 1, wherein the processing system is configured to communicate with the remote device by transmitting a signal to the remote device, via the interface, at the selected one of the two or more polarizations.

4. The apparatus of claim 1, further comprising at least one antenna, wherein the interface is configured to receive the interference at each one of the two or more polarizations via the at least one antenna, and the apparatus is configured as a wireless node.

5. An apparatus for wireless communications, comprising:
    an interface configured to receive at least one destination address field in at least one frame; and
    a processing system configured to:
        decode the received at least one destination address field to determine at least one destination address of the at least one frame;
        determine whether an address of the apparatus matches the at least one destination address of the at least one frame;

detect interference if the address of the apparatus does not match the at least one destination address, wherein the interference comprises the at least one frame, and the interface is configured to receive the interference at each one of two or more polarizations in response to the detection of the interference;

measure a strength of the received interference at each one of the two or more polarizations;

select one of the two or more polarizations based on the measured interference strengths; and communicate with a remote device, via the interface, using the selected one of the two or more polarizations.

6. The apparatus of claim 5, wherein the processing system is configured to communicate with the remote device by receiving a signal from the remote device, via the interface, at the selected one of the two or more polarizations.

7. The apparatus of claim 5, wherein the processing system is configured to communicate with the remote device by transmitting a signal to the remote device, via the interface, at the selected one of the two or more polarizations.

8. The apparatus of claim 5, wherein the selection comprises selecting one of the two or more polarizations corresponding to a lowest one of the measured interference strengths.

9. The apparatus of claim 5, further comprising at least one antenna, wherein the interface is configured to receive the interference at each one of the two or more polarizations via the at least one antenna, and the apparatus is configured as a wireless node.

10. An apparatus for wireless communications, comprising:

an interface configured to receive at least one frame comprising at least one duration field; and a processing system configured to:
 decode the received at least one duration field to determine a duration of an interference, wherein the interference comprises the at least one frame, and the interface is further configured to receive the interference at each one of two or more polarizations within the determined duration;
 measure a strength of the received interference at each one of the two or more polarizations;
 select one of the two or more polarizations based on the measured interference strengths; and
 communicate with a remote device, via the interface, using the selected one of the two or more polarizations.

11. The apparatus of claim 10, wherein the processing system is configured to communicate with the remote device by receiving a signal from the remote device, via the interface, at the selected one of the two or more polarizations.

12. The apparatus of claim 10, wherein the processing system is configured to communicate with the remote device by transmitting a signal to the remote device, via the interface, at the selected one of the two or more polarizations.

13. The apparatus of claim 10, wherein the selection comprises selecting one of the two or more polarizations corresponding to a lowest one of the measured interference strengths.

14. The apparatus of claim 10, further comprising at least one antenna, wherein the interface is configured to receive the interference at each one of the two or more polarizations via the at least one antenna, and the apparatus is configured as a wireless node.

15. An apparatus for wireless communications, comprising:

an interface configured to receive interference at each one of two or more polarizations; and a processing system configured to:
 measure a strength of the received interference at each one of the two or more polarizations;
 select one of the two or more polarizations based on the measured interference strengths, wherein the interface is further configured to receive a plurality of signals from the remote device at the selected one of the two or more polarizations;
 measure a strength of each one of the plurality of signals;
 select one of the plurality of signals based on the measured strengths of the plurality of signals;
 communicate with a remote device, via the interface, using the selected one of the two or more polarizations; and
 generate a message indicating the selected one of the plurality of signals, wherein the interface is further configured to provide the message for transmission to the remove device.

16. The apparatus of claim 15, wherein the selection comprises selecting one of the two or more polarizations corresponding to a lowest one of the measured interference strengths.

17. The apparatus of claim 15, wherein the processing system is configured to communicate with the remote device by receiving a signal from the remote device, via the interface, at the selected one of the two or more polarizations.

18. The apparatus of claim 15, wherein the processing system is configured to communicate with the remote device by transmitting a signal to the remote device, via the interface, at the selected one of the two or more polarizations.

19. The apparatus of claim 15, further comprising at least one antenna, wherein the interface is configured to receive the interference at each one of the two or more polarizations via the at least one antenna, and the apparatus is configured as a wireless node.

20. An apparatus for wireless communications, comprising:

an interface configured to receive interference using a plurality of receive beams at each one of two or more polarizations; and a processing system configured to:
 measure a strength of the received interference for each one of the plurality of receive beams at each one of the two or more polarizations;
 select, for each one of the receive beams, one of the two or more polarizations based on the measured interference strengths for the receive beam; and
 communicate with a remote device, via the interface, using one of the plurality of receive beams at the selected one of the two or more polarizations for the one of the plurality of receive beams.

21. The apparatus of claim 20, wherein:

the interface is configured to receive, for each one of the plurality of receive beams, a signal from the remote station at the selected one of the two or more polarizations for the receive beam; and the processing system is further configured to measure a strength of each one of the received signals, to select one of the plurality of receive beams based on the measured strengths of the received signals, and to communicate, via the interface, with the remote device using the selected one of the plurality of receive beams.

22. The apparatus of claim 20, wherein the processing system is configured to communicate with the remote device by receiving a signal from the remote device, via the interface, using the one of the plurality of receive beams at the selected one of the two or more polarizations for the one of the plurality of receive beams.

23. The apparatus of claim 20, wherein the processing system is configured to communicate with the remote device by transmitting a signal to the remote device, via the interface, using the one of the plurality of receive beams at the selected one of the two or more polarizations for the one of the plurality of receive beams.

24. The apparatus of claim 20, wherein the selection for each one of the receive beams comprises selecting one of the two or more polarizations corresponding to a lowest one of the measured interference strengths for the receive beam.

25. The apparatus of claim 20, further comprising at least one antenna, wherein the interface is configured to receive the interference for each one of the plurality of receive beams at each one of the two or more polarizations via the at least one antenna, and the apparatus is configured as a wireless node.

\* \* \* \* \*